Jan. 11, 1955     T. VIGMOSTAD     2,698,957
HINGE DEVICE
Filed July 30, 1949           2 Sheets-Sheet 2
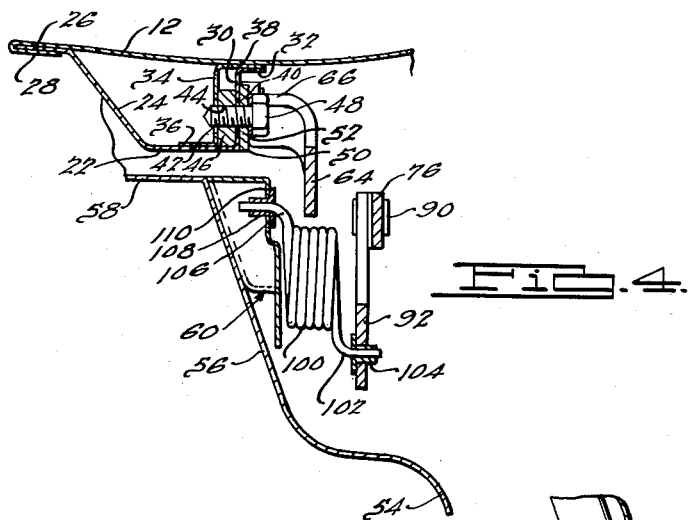
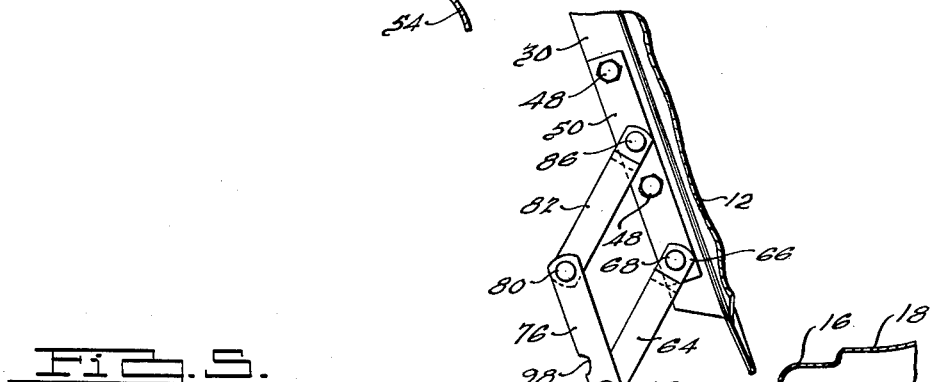
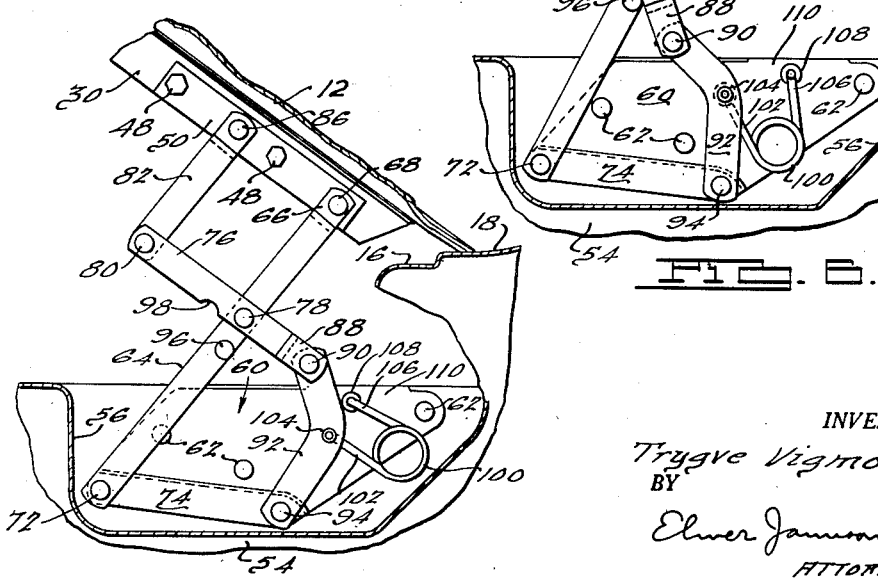
INVENTOR.
Trygve Vigmostad.
BY
Elwer Jannson Gray
ATTORNEY.

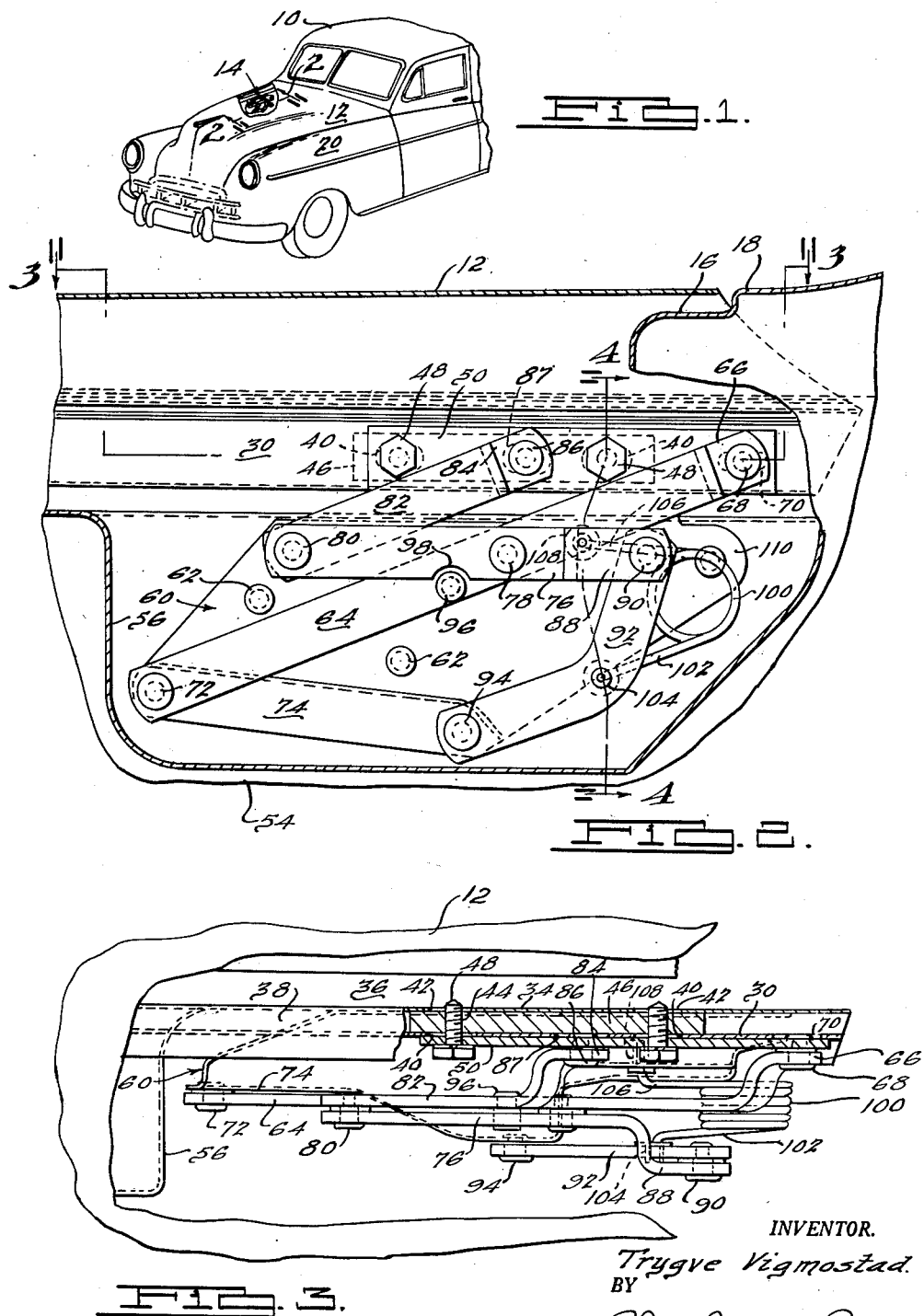

United States Patent Office 2,698,957
Patented Jan. 11, 1955

2,698,957

HINGE DEVICE

Trygve Vigmostad, Detroit, Mich., assignor to Briggs Manufacturing Co., Detroit, Mich., a corporation of Michigan Application July 30, 1949, Serial No. 107,769

3 Claims. (Cl. 16—128.1)

This invention relates to an improved hinge device which is particularly adapted for use in connecting the engine hood or bonnet of a modern automobile to the body structure to permit raising and lowering of the hood as required for access to the engine compartment. However it is to be understood that the hinge embodying the present invention may also be employed with an automobile rear deck lid, or with other comparable swinging members wherein a hinge having the characteristics discussed below is required.

It is common practice in the construction of automobile bodies to provide a one piece pressed metal engine hood or bonnet which is raised or lowered from the front about a generally horizontal transverse hinge axis located near the rear of the hood. In this construction the rear edge of the hood usually closely overlies a forward portion, such as the cowl, of the automobile in the nature of an overlap or batten to prevent rain from entering the engine compartment. As a result, when the hood is pivotally raised at the front end, it is also necessary to raise the hinge point simultaneously, otherwise the rear edge of the hood will dip downward and strike the underlying body structure.

It is accordingly an object of the present invention to provide an improved hinge device for an automobile hood or other swinging lid whereby as the free end of the hood or lid is swung relatively to the body the hinged end will be simultaneously moved in a corresponding direction but to a lesser extent.

Another object is to provide an improved hinge device which is particularly but not exclusively adapted for use with an automobile engine hood or other swinging lid, whereby the forward end of the hood or lid may be raised as far as desired toward the vertical to permit freedom of access to the engine compartment without causing the rear end of the hood to move downwardly against the underlying body structure.

A further object is to provide a hinge device of the foregoing character for a swinging lid or closure, as for example an automobile hood or bonnet, wherein the lid or closure is yieldingly urged by spring means to either a fully open or to a fully closed position upon movement of the member from an intermediate neutral position toward the open or closed position respectively and wherein the member is firmly and surely held in the fully open position without danger of accidentally closing and without the necessity of setting a detent or latch means. Still another object is to provide such a hinge device which permits the hood or closure member to be readily swung from the open position toward the closed position and past the neutral position by a minimum of manual force, without the necessity of first releasing a detent or latch means, the hood being thereafter positively urged to the closed position, as for example to assure engagement with a suitable latch means for locking the member in closed position.

Another and more specific object is to provide an improved hinge device comprising a rigid link pivotally connected at one end to a rear portion of an automobile hood or other swinging lid and pivotally connected at the other end to a fixed portion of the automobile body forward of the first pivot, and also comprising pivoting means operatively coupled between the body and hood for pivotally raising and lowering the front end of the latter about the rearmost pivot, the pivoting means and link being cooperative so that the forward or rearward pivoting respectively of the link about the foremost pivot and the pivotal raising or lowering respectively of the hood about the rearmost pivot will occur in unison. Thus, as the forward end of the hood is raised, the rear end of the latter will swing forward and upward with the link about the forward pivot to clear the underlying body portions.

Another object is to provide a hinge device of the foregoing character which is comparatively simple and sturdy in construction, reliable and efficient in operation, and economically manufactured and installed.

Other objects of this invention will appear in the following description and appended claims, reference being had to the accompanying drawings forming a part of this specification wherein like reference characters designate corresponding parts in the several views.

Fig. 1 is a fragmentary perspective view of the front end of an automobile with portions of the engine hood broken away to show the location of a hinge device constructed in accordance with the present invention and connecting the hood with the body of the automobile.

Fig. 2 is a fragmentary enlarged vertical section taken in the direction of the arrows substantially along the line 2—2 of Fig. 1, showing an inside elevation of the hinge device of Fig. 1 in the closed position.

Fig. 3 is a fragmentary horizontal section taken in the direction of the arrows substantially along the broken line 3—3 of Fig. 2.

Fig. 4 is a fragmentary vertical section taken in the direction of the arrows substantially along the broken line 4—4 of Fig. 2 through the center line of selected pivotal connections of the hinge device.

Fig. 5 is a fragmentary vertical section similar to Fig. 2 but showing the hinge device on a reduced scale in the neutral position.

Fig. 6 is a view similar to Fig. 5, but showing the hinge device in the open position.

Before explaining the present invention in detail it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Details of a preferred construction and application of the present invention are illustrated by way of example in the drawings wherein an automobile 10 is shown employing a one-piece engine hood 12 pivotally connected to fixed portions of the body 10 by a pair of hinge devices indicated generally by the numeral 14, Fig. 1. In the present instance, a hinge 14 comprising a plurality of links pivotally connected for relative swinging movement about a plurality of horizontal transverse axes, is mounted on each side of the hood 12. Inasmuch as the hinge 14 and the mounting therefor provided by the hood 12 and body 10 are substantially the same in operation and construction on each side of the vehicle, a showing of the hinge 14 and mounting on only the right side of the vehicle will be sufficient herein.

In accordance with customary automobile construction, the hood 12 is latched at its forward end to a fixed portion of the body 10 by means not shown and is pivotally raised or lowered from its front end about a generally horizontal transverse pivot axis located near the rear of the hood as hereinafter described, Figs. 5 and 6. The rear edge of the hood 12 overlaps a recessed ledge 16 comprising a forward projection of a fixed cowl 18 integral with the automobile body proper immediately forward of the windshield structure, Figs. 1 and 2.

Each lateral edge of the hood 12 lies adjacent the mesial portions of the corresponding fender 20 above the customary wheel housing and is provided with a longitudinally extending sheet metal channel bracket 22 having an outer sidewall 24 inclined upward and laterally to terminate in a horizontal edge flange 26 underlying the lateral edge of the hood 12. The latter is formed at 28 around the under side of the flange 26 to comprise a reinforced triple thickness marginal edge for the hood 12, the component elements thereof being preferably welded together.

The inner sidewall 30 of the channel bracket 22 extends generally vertically upward and bends at 32 horizontally inward at a location spaced below the undersurface of the hood 12. Extending longitudinally of the wall 30 and spaced laterally therefrom is a right-angular S-section reinforcing bracket 34 having a base or footing 36 welded to the base of the channel bracket 22 and an upper arm 38 overlying the horizontal flange 32 and welded thereto. The forward and rearward ends of the brackets 22, 34 are preferably secured by means not shown, as for example by welding, to rigid portions of the hood 12 for reinforcement thereby.

The vertical bracket wall 30 is provided with a pair of longitudinally spaced and slotted adjusting bolt holes 40 which are aligned in pairs with a similar pair of holes 42 in the vertical bracket wall 34. The aligned holes 40, 42 are also aligned with a corresponding pair of screw threaded bolt holes 44 extending transversely through a supporting bar 46 spacing the walls 30 and 34 and held in position by a pair of bolts 48 screwed into said holes 44 and passing through the aligned holes 40, 42.

Also secured against the inner face of the wall 30 by the bolts 48 is a longitudinally extending pivot supporting bar 50 which extends rearward of the spacer bar 46. Preferably a lock washer 52 is provided around the shank of each bolt 48 between its head and the adjacent inner surface of the pivot supporting bar 50. By virtue of the length of the adjusting bolt holes 40, 42 the longitudinal positions of the bolts 48 and the bars 46, 50 connected thereby may be adjusted during assembly for the purpose which will be apparent below.

Underlying the hood 12 and comprising an integral structure of the body 10 on each side thereof is a wheel housing or panel 54 which extends downward below the inside of the rim of the automobile wheel in accordance with conventional construction. The upper portion of each wheel housing or panel 54 is recessed outwardly at 56 to provide a space within which one of the hinge devices 14 is mounted. Above the recess 56, the panel 54 extends outward as at 58 and eventually upward to underlie the triple thickness rim of the hood 12. Mounted within the recess 56 is a bracket for the hinge device 14, indicated generally by the numeral 60, preferably comprising a sheet metal stamping suitably secured to the outer wall portion of the recess 56, as for example by a plurality of rivets 62.

Each of the hinge devices 14 which permit the forward end of the hood 12 to be pivotally raised without depressing the rear end thereof into the fixed cowl portion 16 comprises a rearwardly inclined rigid bar or control link 64 having an outward offset upper end 66 pivotally connected by a horizontal transverse pivot pin or rivet 68 to the rearward end of the corresponding pivot supporting bar 50 at a location approximately underlying the rearward edge of the hood 12. Opposite ends of the pin or rivet 68 are expanded snugly against the adjacent inner surface of the link portion 66 and the outer surface of the bar 50. As indicated in Fig. 3, an opening 70 is provided in the bracket 30 to receive the outer expanded end of the pin 68 and is sufficiently oversize longitudinally to permit the aforementioned limited longitudinal adjusting movement of the bar 50 as required in assembly. The lower end of the control link 64 is pivotally connected at 72 to the vertical wall of an inward embossment 74 of the bracket 60 for swinging about a fixed axis parallel to the pin 68.

By virtue of the control link 64, it is apparent that as the latter is pivoted about the fixed pivot 72, the upper end 66 and likewise the pivotally connected rear end of the hood 12 will be pivoted forward and upward. In order to provide means cooperative with the control link 64 for rapidly elevating the front end of the hood 12 in unison with the forward and upward movement of the rear end, a cross link 76 is provided which is pivotally connected by a horizontal transverse pivot pin 78 to the link 64 intermediate the ends of both links 64 and 76. The forward end of the link 76 is pivotally connected by a transverse pivot pin 80 to the lower end of a forward upper link 82. The upper end 84 of the latter is offset outwardly sufficiently to lie adjacent the pivot supporting rod 50 and is pivotally secured to the latter by a transverse pin 86 at a location forward of the pivot 68. The rearward end 88 of the cross link 76 is offset inwardly and is pivotally connected by a transverse pivot pin 90 to the upper end of a dog leg link 92. The latter extends generally downward and forward to a lower end which is pivotally connected by a transverse pin 94 to the aforesaid vertical embossment wall 74 at a location rearwardly of the pin 72 and slightly below the latter.

It is apparent from the linkage thus far described that the forward upper link 82 and the portion of the cross link 76 forward of the pivot 78 comprise in effect a toggle having an articulated knee 80. Upon straightening the latter as indicated in Figs. 5 and 6, the forward end of the hood 12 is rapidly elevated about the pivot 68. Also as the control link 64 is swung upward and forward about the pivot 72, the rearward end of the cross link 76 pivotally connected at 90 to the upper end of the dog leg link 92 pulls the latter forward and upward in a pivotal movement around the lower pivot 94.

The distance between the pivots 90 and 94 is somewhat less than the distance between the pivots 72 and 78, so that the latter pivot will be elevated more rapidly than the pivot 90 upon forward swinging of the control link 64. Accordingly, upon the forward movement of the control link 64, the cross link 76 will pivot clockwise about the pivot 78, thereby straightening the knee 80 of the aforesaid toggle and swinging the forward end of the hood 12 rapidly upward with respect to the rear end. The reverse movements will of course occur upon closure of the hood 12.

Preferably the pivots 68, 78, 80 and 86 comprise four points of an equilateral pantograph means which is operatively coupled with the vehicle body 10 for swinging the hood 12 about the pivot 68 in unison with swinging of the arm 64. The operative coupling between the upper pantograph means and the body 10 in turn is a lower pantograph means having the longest link in the present instance comprising the lower portion of the control arm 64. A somewhat shorter link comprises the portion of the body 10 between the pivots 72 and 94, which is somewhat longer than the effective length of the dog leg link 92 between the pivots 90 and 94. The shortest link comprises the rearward end of the cross link 76. Also in the present instance the pivot 78 connecting the links 64 and 76 is closer to the pivot 68 than to the pivot 72, and is closer to the pivot 90 than to the pivot 80.

Accordingly, after the initial upward movement of the rear end of the hood 12 from the closed position, Fig. 2, and as the rearward edge of the hood 12 clears the recessed projection 16 of the fixed cowl 18, the pivot 90 will approach the crest of its movement about the pivot 94 and the component of vertical movement of the pivot 90 will practically cease. The pivot 78 will continue to move upward and forward, so that the knee 80 will straighten abruptly and swing the forward end of the hood 12 rapidly upward to substantially a vertical position, Fig. 6. The upper limit of movement of the hood 12 is determined by a stop or pin 96 suitably located on the control link 64 and projecting inward slightly below the pivot 78. As the cross link 76 approaches the vertical position, the portion thereof below the pivot 78 strikes the projecting stop 96 to prevent further raising movement of the hood 12. As indicated in Fig. 2, the portion of the link 76 immediately above the stop 96 in the closed position is notched at 98 to avoid contact between the link 76 and stop 96 upon closure of the hood 12.

In order to counterbalance the weight of the hood 12 a helical torsion spring 100 having a horizontal transverse axis is provided. An inner end or arm 102 of the spring 100 extends generally forward to the knee of the link 92 and is pivotally connected thereto under tension within a horizontal transverse eyelet 104 suitably secured within said knee. The other or outer arm 106 of the spring 100 extends generally forward under tension to a pivotal attachment within a fixed transverse eyelet 108 suitably secured within a vertical wall or embossment 110 of the bracket 60 at a location forward and above the eyelet 104 when the hood 12 is closed, Fig. 2, but rearward of the eyelet 104 when the hood is in raised position, Fig. 6.

The tension on the spring arms 102 and 106 which are pivotally secured within their respective eyelets 104 and 108 is directed to separate the latter. Accordingly, the lever 92 in the closed position of the hood 12 is forced downward and rearward to maintain the hood 12 closed. As the link 92 pivots counterclockwise about the pivot 94 to raise the hood 12 against the tension of the spring arm 102, the eyelet 104 will, of course, move forward until into alignment with the eyelet 108 and the pivot 94, Fig. 5, whereat the tension exerted by the spring arm 102 on the link 92 is normal to the movement of the latter. In this position, the hood 12 will be in the neutral position at which the spring 100 exerts no force tending either to raise or lower the hood. Upon continued counterclockwise movement of the link 92 beyond the neutral position of Fig. 5, the eyelet 104 will move forward of the straight line joining the eyelet 108 and pivot 94, so that the tension of the spring 100 tending to separate the arms 102, 106 will force the lever 92 pivotally forward or counterclockwise, swinging the hood 12 upward to the fully open or raised position, Fig. 6.

It is thus apparent that in raising the hood from the fully closed position to the neutral position, sufficient force must be exerted thereon to overcome the tension of the spring 100. Thereafter the tension in the spring 100 will be directed against the load or weight of the hood. As may be observed in Fig. 6, as the hood approaches the limit of its upward movement, the pivots 68 and 72 approach a position of vertical alignment and the center of gravity of the hood 12 approaches positions directly above these pivots. As a result the moment of force of the hood 12 tending to pivot the latter counterclockwise in a closure movement about the pivot 68, or to swing the control arm 64 clockwise about the pivot 72, rapidly decreases and reaches a minimum at the fully raised position of Fig. 6. The spring 100 may thus be preloaded to counterbalance the weight of the hood effectively above the neutral position and in fact to exert an increasing force urging the hood upward as the latter approaches its upper limit of movement, whereby the hood will be held in a raised position against accidentally falling, without the requirement or necessity of setting a stop or brace or other means to hold the hood in the open position.

Upon exertion of sufficient force on the forward or upper end of the hood 12 to overcome the tension of the spring 100 in a closure action, the hood will be lowered below the neutral position, whereat the direction of force exerted by the spring 100 on the link 92 with respect to the pivot 94 is reversed, drawing the hood positively and firmly into engagement with the customary latch means, not shown, which holds the hood in the closed position.

I claim:
1. In a hinge device for the hood of a motor vehicle body, a swinging supporting link pivotally connected at its lower end to the body and at its upper end to the rear end of the hood, said link extending in a rearwardly inclined direction from the lower end to the upper end thereof in the closed and fully open positions of the hood, a cross link pivotally connected to said supporting link intermediate the ends of both links, a lower link pivotally connected to the body rearwardly of the pivotal connection of the supporting link to the body and pivotally connected at its upper end to the rear end of the cross link, an upper link pivotally connected at its lower end to the forward end of the cross link and pivotally connected at its upper end to the hood forwardly of the upper end of the supporting link, said upper link extending substantially parallel to the supporting link in all positions thereof, and counterbalancing spring means connecting the body and said lower link for urging said hood upwardly during a final stage of opening movement of the hood.

2. A hinge device according to claim 1 in which the spring means comprises an intermediate coiled portion and spaced spring arms extending therefrom, the end of one arm being connected at a first point to the body and the end of the other arm being connected at a second point to said lower link, said second point being adapted to move when the hood is opened from rear to front of a line passing through said first point and the pivotal axis of swinging of the lower end of said lower link.

3. A hinge device according to claim 1 wherein cooperating blocking means is provided on said supporting and cross links for limiting swinging motion of said links at the fully raised open position of said hood.

References Cited in the file of this patent

UNITED STATES PATENTS

| | | |
|---|---|---|
| 758,530 | Gross | Apr. 26, 1904 |
| 2,137,751 | Davis | Nov. 22, 1938 |
| 2,154,733 | DeOrlow | Apr. 18, 1939 |
| 2,185,214 | Claud-Mantle | Jan. 2, 1940 |
| 2,201,333 | Carlson | May 21, 1940 |
| 2,204,991 | Haltenberger | June 18, 1940 |
| 2,258,065 | DeOrlow | Oct. 7, 1941 |